Feb. 9, 1932.   J. E. BRADLEY   1,844,740
AEROPLANE SAFETY DEVICE
Original Filed Dec. 20, 1928
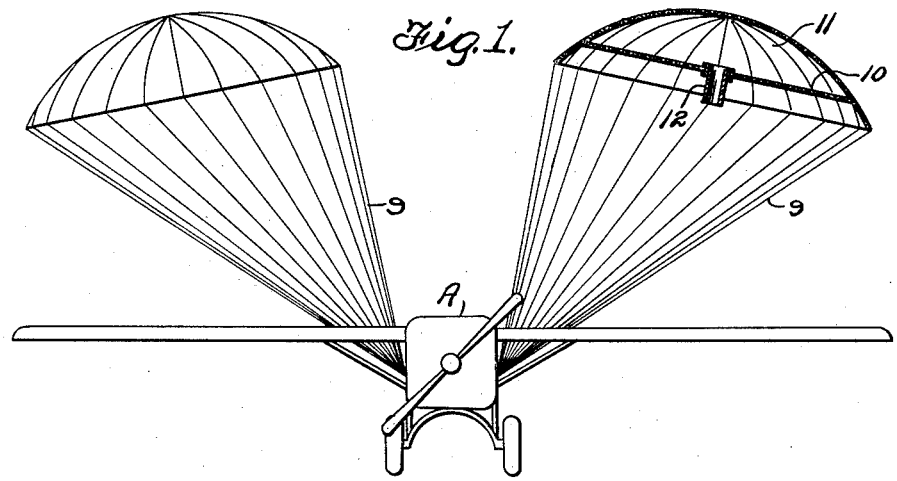
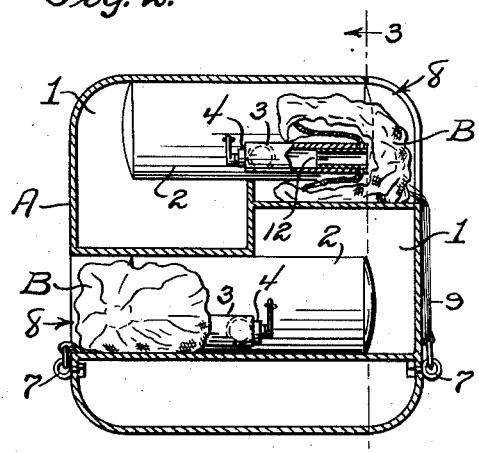
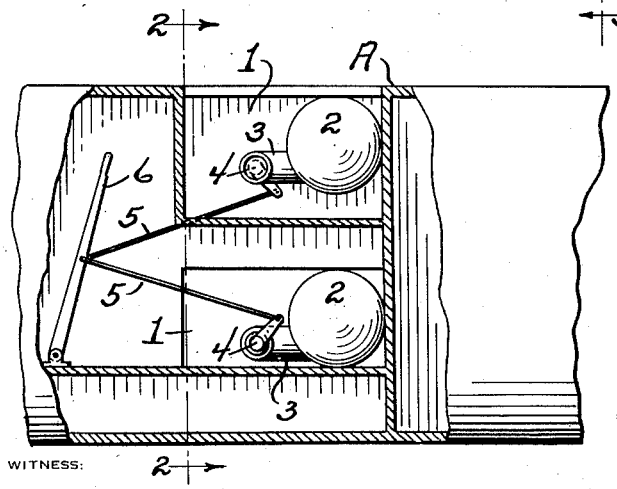
James Edward Bradley
INVENTOR
BY Victor J. Evans
ATTORNEY
WITNESS:

Patented Feb. 9, 1932

1,844,740

UNITED STATES PATENT OFFICE

JAMES EDWARD BRADLEY, OF CHICAGO, ILLINOIS

AEROPLANE SAFETY DEVICE

Refile of abandoned application Serial No. 327,279, filed December 20, 1928. This application filed May 18, 1931. Serial No. 538,377.

This invention relates to a safety device for aeroplanes, the general object of the invention being to provide a number of specially constructed parachutes, known as "paraboons," which are suitably attached to the fuselage, with compressed fluid means for ejecting the parachutes from their compartments in the fuselage so that the parachutes can be ejected from the fuselage and opened in the minimum amount of time, whereby the parachutes will enable a disabled aeroplane to make a safe landing under control.

Another object of the invention is to construct each parachute with a chamber therein with which communicates a tube, said tube engaging the exhaust pipe of a pressure tank containing the compressed fluid, whereby when the valve in the exhaust pipe is opened, the compressed fluid will pass into the chamber and thus eject the parachute from the fuselage and expand or open the parachute.

The chamber in the parachute and its tube also act to keep the parachute afloat, if the plane should land in water, for in this case, the water would close the tube and thus act to retain the air in the chamber and make the parachute buoyant, so that the parachutes would prevent sinking of the plane.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a front view of an aeroplane, with the parachutes open and with one of the parachutes in section.

Figure 2 is a section on line 2—2 of Figure 3.

Figure 3 is a section on line 3—3 of Figure 2.

In these views, the letter A indicates the fuselage of an aeroplane which is formed with the compartments 1 to receive the tanks 2 which contain compressed air or other fluid. These compartments also receive the folded parachutes B. Each tank is provided with an outlet pipe 3 which contains a valve 4, the handles of the valves being connected by links or cables 5 with a hand lever 6 so that the valves can be opened simultaneously by moving this lever. The fuselage has the eye bolts 7 at the sides thereof, below the openings 8, which communicate with the chambers 1, and the cables 9 of the parachutes are connected with these bolts, so that when the parachutes are in open condition, they will support the aeroplane and permit it to make a safe landing under control.

Each parachute has a partition 10 therein which forms a chamber 11 in the upper part thereof, and a tube 12 has its upper end passing through the center of this partition and is suitably attached to the partition. When the parachute is folded and placed in its chamber 1, this tube is placed in the outer end of the outlet tube 3 of the tank so that when the valve 4 is opened, the compressed air in the tank will rush through the tube 12 into the chamber, thus ejecting the parachute with great force through the opening 8 and opening the parachute. As before stated, the parachutes when thus opened, will support the craft and permit it to make a safe landing under control and as the parachutes are opened almost instantaneously after the valves are opened, the craft comes under the control of the parachutes before it has a chance to fall to any great distance.

As before stated, if the parachutes and the craft should drop into water, the water closing the tubes 12, will act to hold the air in the chamber 11 and thus prevent the craft from sinking.

The parachutes and their partitions are made of waterproof material and it will, of course, be understood that as many parachutes may be used as are necessary to properly support the craft.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:—

In combination with an aeroplane having a number of chambers in its fuselage, a tank in each chamber containing compressed fluid, an outlet pipe connected with each tank, a valve in each pipe, a parachute placed in each chamber in folded condition, means for connecting the parachutes with the aeroplane, a partition in each parachute forming a chamber therein, a tube carried by each partition and in communication with the chamber, said tube engaging the outlet pipe of each tank when the parachute is placed in its chamber and means for opening the valves simultaneously, whereby the fluid in the tanks will rush into the chambers of the parachutes, thus ejecting the parachutes from the aircraft and opening them, said chambers in the parachutes also acting as buoyant means if the aircraft should land in water, as the water closing the ends of the tubes will prevent the escape of air from the chambers.

In testimony whereof I affix my signature.

JAMES EDWARD BRADLEY.